United States Patent [19]
Anderson

[11] Patent Number: 4,472,708
[45] Date of Patent: Sep. 18, 1984

[54] FRONT-LIGHTED MAGNETO-OPTIC DISPLAY

[75] Inventor: Robert H. Anderson, Long Beach, Calif.

[73] Assignee: Litton Systems, Inc., Beverly Hills, Calif.

[21] Appl. No.: 375,323

[22] Filed: May 5, 1982

[51] Int. Cl.³ .............................................. G09G 3/20
[52] U.S. Cl. .................... 340/783; 340/763; 350/388
[58] Field of Search ............ 350/276 R, 406, 375, 350/376, 377, 378, 388; 340/783, 784, 763, 765

[56] References Cited

U.S. PATENT DOCUMENTS

| | | | |
|---|---|---|---|
| 3,799,647 | 3/1974 | Luft | 350/388 |
| 3,955,190 | 5/1976 | Teraishi | 350/388 |
| 3,960,438 | 6/1976 | Bonne et al. | 350/388 |
| 3,982,819 | 9/1976 | Letellier | 350/406 |
| 4,088,400 | 5/1978 | Assouline et al. | 350/388 |

*Primary Examiner*—Gerald L. Brigance

[57] ABSTRACT

A magneto-optic display capable of viewing from available front incident light. The display consists of a polarizing sheet, a blank optical bias magneto-optic chip, a structured magneto-optic chip containing the display to be viewed and a reflective surface.

15 Claims, 13 Drawing Figures

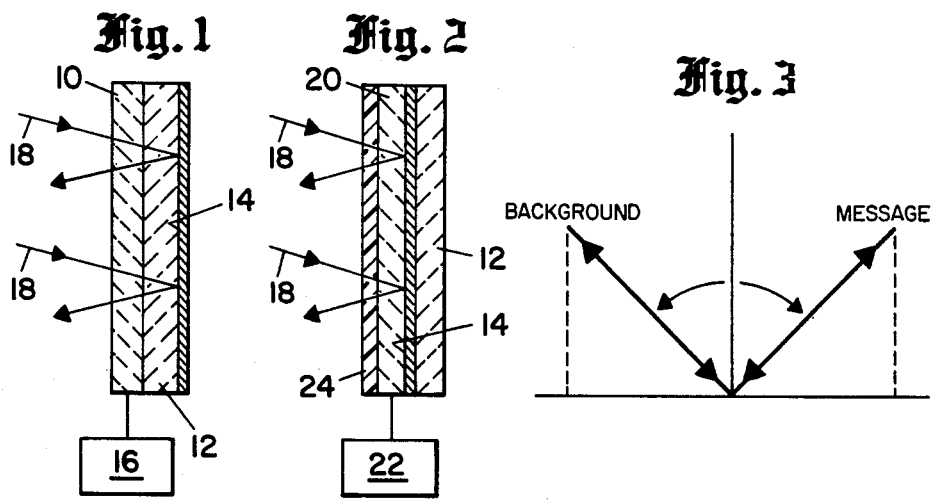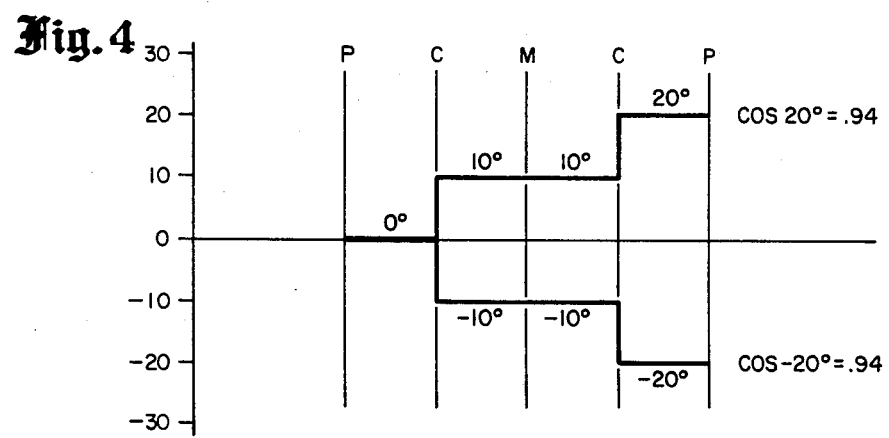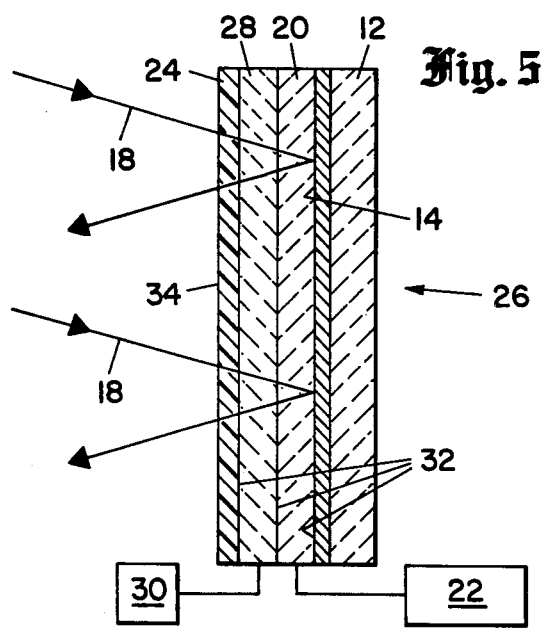

FRONT-LIGHTED MAGNETO-OPTIC DISPLAY

BACKGROUND OF THE INVENTION

The present invention relates to displays, and more particularly, to dynamically changeable displays visible as a result of reflected incident light.

Small displays are incorporated in many hand-held devices and the like recently. The most familiar examples are those employed in wristwatches and hand-held calculators. Since most such small devices are battery operated, battery life is a critical factor in the selection of components. Small displays using light emitting diodes produce their own light and are, therefore, viewable in the absence of incident light. On the negative side, however, light emitting diodes consume more energy than other available display types such as liquid crystals. Liquid crystals modify the light passing therethrough. For viewing in the absence of incident light, they must be lighted from a separate source. Since most viewing takes place in the presence of available incident light, a liquid crystal display can be configured in the manner of FIG. 1 wherein the liquid crystal display 10 has a mirror 12 containing reflective surface 14 attached on the back side. The liquid crystal display 10 is connected to be driven by the control circuit 16. Incident light 18 passes through the liquid crystal display, reflects off of the reflective surface 14 of mirror 12 and passes back through the liquid crystal display 10 to be viewed by the viewer whereby the display information impressed on the liquid crystal display 10 by the control circuit 16 can be viewed.

Recently, magneto-optic displays of the type described in my co-pending applications Ser. No. 375,322, titled SWITCHABLE TANDEM MEMORY MAGNETO-OPTIC DISPLAY and Ser. No. 375,325, titled MAGNETO-OPTIC DISPLAY both filed on even date herewith and assigned to the assignee of this application, have gained rapid popularity. The chip is divided into a rectangular pattern of posts with appropriate control wires disposed therebetween. Each individual post is addressible and can be magnetized in either of two directions. Depending upon the direction of magnetization, polarized light passing therethrough is rotated clockwise or counter-clockwise a fixed amount by the Faraday effect. By viewing the display through a polarized sheet having its polarization axis properly angled, the rotated light is placed closer to or further from axial alignment with the polarization axis of the analyzer sheet to, thereby, appear lighter or darker, respectively. Because of their mode of operation, such displays have been thought to be unusual in the manner of liquid crystal display described in FIG. 1. If, as shown in FIG. 2, a magneto-optic chip 20 connected to a driver circuit 22 with a polarizing sheet 24 placed over its front surface and a mirror 12 having a reflective surface 14 placed adjacent its back surface has incident light 18 reflected back through it in the manner of the liquid crystal display 10, the display information on the magneto-optic chip will be invisible. The reason for this can be seen with reference to FIGS. 3 and 4. Assuming that the polarizer 24 sets the polarization axis at 0° and the magneto-optic chip 20 is imparting a 10° rotation in either direction, after passing through the chip 20, the rotated portions of the potential display will be offset at +10° and −10°, respectively. After reflecting off the mirror reflective surface 14, no rotation will be imparted so that the axial orientation will still be at +10° and −10°, respectively. In passing back through the magneto-optic chip 20, a further 10° of rotation will be effected in the same direction, as is characteristic of such chips. Thus, upon being viewed through the polarizer 24, the light will be rotated to an axial orientation of +20° and −20°, respectively, with respect to the polarizer sheet's 0° axial orientation; that is, both the background areas and the message areas will be offset equally in opposite directions from the vertical. The contrast between the background and message required for the message to be viewed is a function of the cosine of the angle. The cosine of +20° and the cosine of −20° are both 0.94. Consequently, both the background and message have identical amounts of light attenuation and, therefore, present a uniformly illuminated surrface to the viewer.

Wherefore, it is the object of the present invention to provide a magneto-optic display which is viewable as a result of reflected incident light only.

SUMMARY

The foregoing objective has been accomplished by the front-lighted magneto-optic display of the present invention comprising, in sequence, a polarized sheet; a first magneto-optic chip set to give a constant offset over its entire area to a light beam passing therethrough; a second magneto-optic chip adapted to be connected and driven by a display driver; and, a reflective surface.

DESCRIPTION OF THE DRAWINGS

FIG. 1 is a simplified cutaway side elevation of a prior art liquid crystal display viewable with incident light.

FIG. 2 is a simplified cutaway side elevation through an unworkable magneto-optic chip with a reflective surface intended for viewing under incident light when constructed in the manner of the display of FIG. 1.

FIG. 3 is a graphic representation of the angular offset of polarized light for background areas and message areas in the unworkable magneto-optic chip display of FIG. 2.

FIG. 4 is a graph of the offsets of light passing through and back through the display of FIG. 2 showing the reason why the system of FIG. 2 is unworkable.

FIG. 5 is a simplified cutaway side elevation through a magneto-optic display according to the present invention.

DESCRIPTION OF THE VARIOUS EMBODIMENTS

Figure 6:
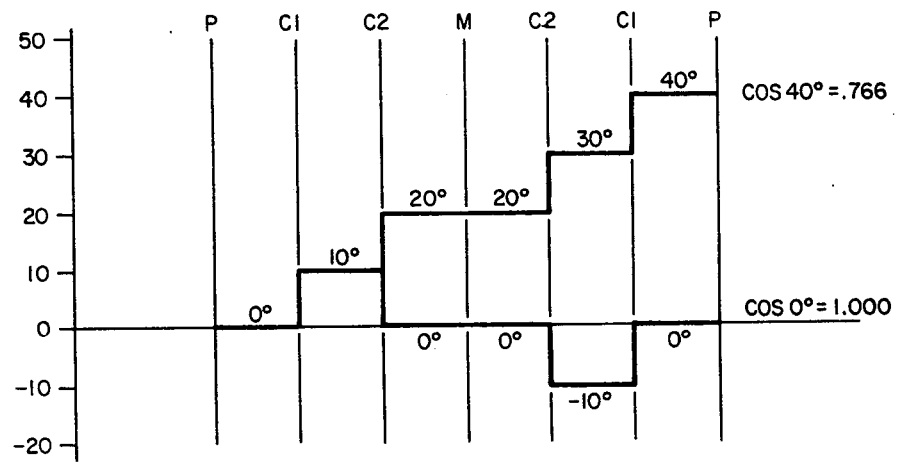
FIG. 6 is a graph in the manner of FIG. 4 showing the rotational offset effected by the display of FIG. 5 in one configuration.

A display 26 according to the present invention is shown in FIG. 5. The magneto-optic chip 20 connected to the driver circuit 22 containing the logic to drive the magneto-optic chip 20 with the display information has mirror 12 positioned with its reflective surface 14 adjacent its back surface as with the prior described unworkable display of FIG. 2. A second, unstructured, magneto-optic chip 20 is placed over the front surface of the chip 20. The polarizing sheet 24 is then placed over the front surface of the chip 28. Chip 28 may be connected to a driver 30 which maintains the second chip 28 magnetized all over in one (either) direction of magnetization. A stable, permanently magnetized chip can also be used. The graph of FIG. 6 shows the resultant effect of incident light 18 passing through this arrangement. For purposes of evaluation, it is assumed that both chips 20 and 28 impart 10° of rotational offset in passing therethrough. Upon passing through the polarizing sheet 24, the light is oriented at the 0° polarization axis. Upon passing through the second, unstructured, magneto-optic chip 28, the entire beam is rotated 10° to a +10° axial orientation. So far, no image information has been introduced, and an undifferentiated beam at +10° reaches the magneto-optic chip 20. Chip 20 is driven by the driver circuit 22 to contain image information stored on it in the form of posts or bubbles which are magnetized oppositely to the surrounding post or background areas. Chip 22, by area, imparts 10° of plus or minus rotation to the light beam. Accordingly, upon striking and returning from the reflective surface 14 of mirror 12, the light beam is oriented with components at +20° and 0°, respectively (being 10° plus 10°, and 10° minus 10°). As in the previously described case, upon passing once again through the magneto-optic chip 20, 10° of offset in the same direction, as previously for each area, is added such that the light is divided into areas with their axes oriented at +30° and −10°, respectively. Upon passing through the unstructured chip 28, however, the entire beam is once again uniformly rotated by 10° in the positive direction. Thus, upon reaching the polarizing sheet 24, the light areas are oriented at +40° and 0°. The transmissions through the polarizing sheet 24 are, respectively, cosine 40°=0.766 and cosine 0°=1, giving an amplitude contrast ratio of 1.3. Since the intensity is the square of the amplitude, this gives an intensity contrast ratio of 1.7. This is a readily distinguishable, but not comfortable, contrast ratio.

The contrast ratio in the example above is low because neither image component is near the low brightness extinction angle of 90° at the polarizing sheet 24 which acts as a polarization analyzer upon viewing. This can be corrected by using other choices of Faraday rotation for the two chips, including rotations which are not equal in the two chips 20, 28.

Figure 7:
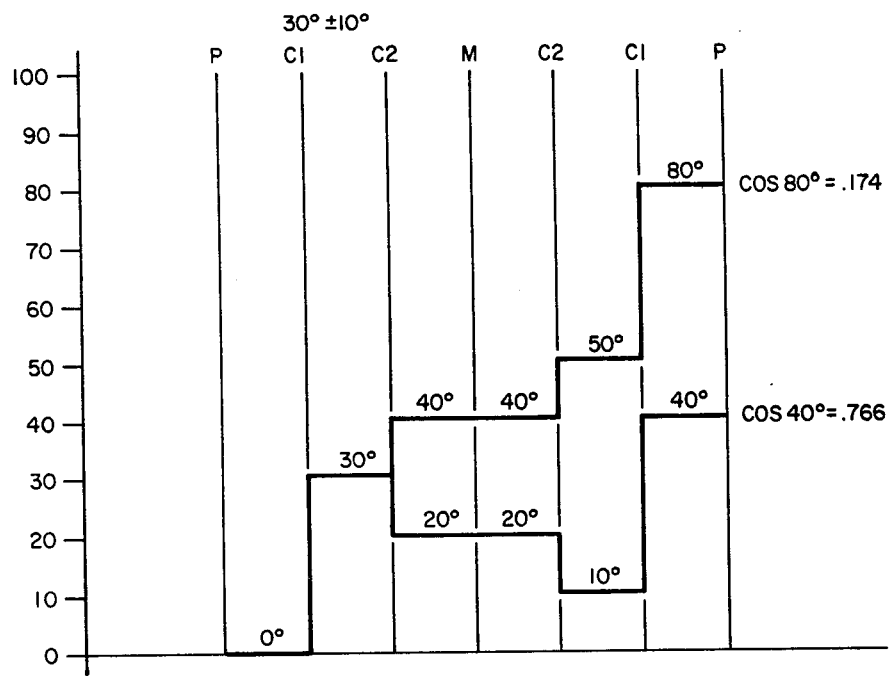
FIG. 7 is a rotational offset graph of the display of FIG. 5 in an alternate configuration.

Many different combinations of film thicknesses, materials formulations, and resulting rotations may be used for the two chips. FIG. 7 shows the effect of using 30° of rotation for the unstructured chip 28 together with 10° of rotation for the display chip 20. Polarized light at 0° enters the bias chip 28, leaving at +30°. The 10° display chip 20 rotates this condition to +20° in some image areas and +40° in the other, oppositely magnetized, image areas. After reflection by the mirror 12 and passage through chip 20, again, the beam components have another 10° change away from each other, emerging at +10° and +50°, respectively. Then, the bias chip 28 adds another 30° of rotation, which is in the same direction to both beam components, and also is in the same direction that chip 28 added before. This final passage through the bias chip 28 gives image components at +40° and +80° entering the polarizer/analyzer sheet 24. The +80° component will be quite dark, insuring reasonably good contrast. Since cosine 40° equal 0.766 and cosine 80° equal 0.174, the amplitude contrast ratio is 0.766/0.174 equal 4.41, and squaring, the intensity contrast ratio is 19.4, which is more than adequate.

The bias chip 28 needs to have 30° of Faraday rotation in the above example. This would require a film thickness in the vicinity of 30 microns using the more common film materials available to date. Since the usual films that thick are rather dark, a better choice would be the new Bismuth-substituted film presently becoming available from Airtron, which is about four times as transparent (in 10 micron films) as the older films. The bias chip 28 can have very high magnetic coercivity, and can be poor in many of its magnetic properties since, in the above case, we are not switching the magnetic field direction of the film. This permits compromises in the bias chip material formulation, favoring optical transparency and rotation at the expense of magnetic properties. This is a very helpful area of trade-off. It also favors the occurrence of chips which do not spontaneously lose their blank uniform bias rotation by spontaneously stripping-out when no bias driver is employed.

It should be noted that in the above example, the darkest, most rotated, beam component is rotated twice by the bias chip 28 and twice by the image display chip 20. Using C1 (for chip 1) and C2 (for chip 2) to represent the angles of Faraday rotation of these chips, the dark beam is rotated through a total angle of (2C1+2C2). Similarly, the bright beam component is rotated through a smaller total angle of (2C1−2C2). Note that the same total rotations would occur if chips C1 and C2 were interchanged in the device. But, placing C2 last, with its posts very close to the mirror or touching it (or even depositing the mirror on the posts) has the advantage of providing a wide viewing angle since parallex offset of the return beam is minimized.

Using the above expressions, the idealized fractional transmissions of aplitudes through the polarization analyzer for the two beam components are COS(2C1+2C2) and COS(2C1−2C2), respectively, and the amplitude contrast ratio is:

$$R_A = COS(2C1-2C2)/COS(2C1+2C2)$$

where absolute values of cosines may also be used, to avoid negative ratios, and the intensity contrast ratio is:

$$R_I = [COS(2C1-2C2)/COS(2C1+2C2)]^2$$

This expression shows that reversing the direction of magnetization of either or both chips does not change the contrast ratio. When one chip has a rotation in excess of 45°, the numerator of the contrast equation becomes smaller than the denominator. A contrast ratio of, for example, ½ would result instead of a contrast ratio of 2. This is correct but inconvenient. All contrast ratios can be kept above 1 by using the formula:

$$R_I = [\cos 2(C1 \mp C2)/\cos 2(C1 \pm C2)]^2$$

where either the two upper or the two lower signs are used together.

In initial tests of the display of FIG. 5, multiple reflections from all of the optical surfaces obscured the image. Therefore, provision to suppress these reflections should be made. To accomplish this, the three spaces between the four sheets should be filled with optical cement, indicated as 32, where the term is used broadly to mean a fairly clear, water-white, non-diffusing material which wets and adheres to the adjacent surfaces, and has an index of refraction generally comparable to the adjacent layers, thereby reducing surface reflection. This may be an optical lens cement such as that sold under the tradename Canada Balsam; or a photopolymer cement such as those sold by Norland Products Company for this purpose; or an epoxy optical cement; or other plastic optical adhesive of Eastman Kodak Company; or G. E. Company's RTV (for room-temperature vulcanizing) plastic; or clear silicone potting compounds. Graphics arts adhesives, including rubber-based cements and spray adhesives or glues, would also reduce reflections, as would the refractive-index matching liquids of Cargille Labs, or clear oils. In this connection, Jenkins and White report in "Fundementals of Optics" 3rd Edition, page 504, having used glycerine or castor oil to cement quartz or calcite together in making Rochan of Wollaston prisms.

The surface facing the observer should also be coated with an anti-reflective coating, designated as 34, such as a surface frosting of a type applicable to plastics. In the alternative, an additional glass plate, having a frosted surface or anti-reflective coating of MgO or similar films, could be optically cemented to the outer surface of the polarizer 24, and would also form a protective plate at 34.

In some specialized applications such as in photography or microscopy, unwanted multiple surface reflections may be eliminated by controlling the source of illumination so that such reflections are directed away from the eye of the observer. In that case, the mirror of previous figures may be replaced by a white or metallic diffusing surface of a type which depolarizes only minimally. Some fairly dense or glazed white papers or cardboards are suitable, as in the aluminized projection screen material used for 3-D movies.

Having considered the provisions which can be made to reduce unwanted reflections, we can now return to the main question of what combinations of film thicknesses to use. As a starting point, the following analysis indicates that a display film having about 12° of rotation and a higher transparency bias film having about 24° of rotation are in the central region of the preferred design domain. Equally thick films of the same material having 17° of rotation are another possibility. Where there is a great difference in transparency of the two films, thick display films having only 4° of rotation can yield contrast ratios around 6 when combined with very transparent 35° bias films. These conclusions are reached as follows.

Figure 8:
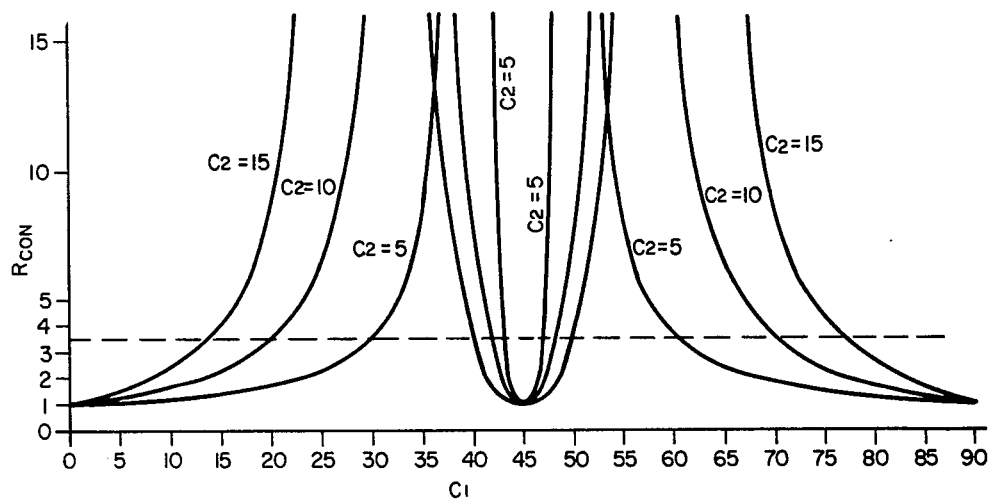
FIG. 8 is a graph of a family of curves for various type chip constructions as can be employed in the display of the present invention.

In FIG. 8, the display contrast ratio is plotted against the rotation obtained from various bias chips (C1) as a design variable. The family of curves is for several display chip rotations, and it should be recalled that interchanging rotations C1 and C2 yields the same contrast. Starting at the left end of the curve for C2=10 is a display chip having 10° of rotation (the inoperative condition of FIG. 2) where there is no bias rotation, the two components of the image are displaced equal amounts in opposite directions and, therefore, have equal fractional transmissions through the analyzer, such that there is no contrast, or a contrast ratio of 1. Moving rightward along the curve for C2=10, the introduction of bias rotation turns both image component axes in the same direction, decreasing the transmission of one component, and, at first, somewhat increasing the transmission of the other component, so some contrast begins to appear. When the bias rotation reaches 10° on the abcissa, the bright image is at 0° and is at maximum transmission. The dimmer image component has a larger angular difference between its polarization axis and that of the analyzer. This angle may be said to lead the comparable bright image angle, as the bias rotation is increased. Above 10°, bias, both image components are reduced in transmission, and the darkest, or leading, component reduces fastest, further increasing the contrast ratio. The darkest component approaches extinction at 90°, when the bias rotation approaches 35°, since cosine 2(35+10)=0, so the contrast curve approaches infinity and is asymtotic to a bias of 35°. At somewhat higher bias rotations, the darkest image component leaves extinction and is somewhat brighter such that finite contrast ratios occur in a second limb of the curve lying above 35° bias. This curve drops to zero contrast, or a contrast ratio of 1, at a bias of 45° because the bright image component is approaching extinction and becomes equal to the dark image component leaving extinction at 45°. Going from 45° to 55° bias, the formerly brightest (lagging) image component approaches and reaches extinction while the formerly dark (leading) component now has a low, but finite transmission. Contrast goes to infinity again and the curve is asymtotic to 55° bias. Above 55° bias, a third limb of the curve starts as the formerly brightest image component comes out of extinction and its brightness trails behind, or lags, the other image component until both components become equal again when their polarization axes straddle the analyzer axis at 90° bias. The family of contrast curves repeats itself periodically above 90° and below 0°, as many other trigonometic functions do.

The curves of FIG. 8 also answer the question of what would happen if we achieved and used very high rotations in reasonably transparent films since any contrast ratio can be achieved on any limb of the curve. For example, at 70° bias and 10° display chip, on the third limb of the curve, an intensity contrast ratio of 3.53 occurs; but, this same contrast could have been reached on the first limb of the curve with a thinner, more transparent, bias film of 20° rotation, with the same 10° display chip. There appears to be no inducement to go above rotations of 45° on either chip, and in what follows, it will be seen that much lower rotations suffice.

Figure 9:
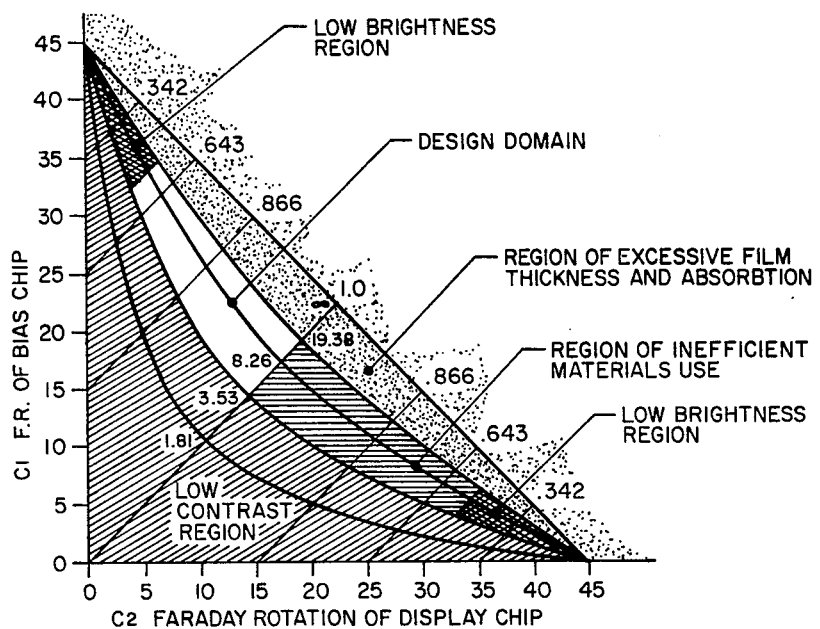
FIG. 9 is a graph of the two chips of the present invention in various possible configurations indicating the design objectives for maximum viewability.

Accordingly, the data region of interest for both chips below 45° is replotted in FIG. 9 to show a family of curves of constant contrast as a function of the rotations of both chips, C1 and C2. The straight line of negative slope running from left (0,45) down to (45,0) represents the infinite contrast ratio achieved when either image component is at extinction, crossed at 90° to the analyzer. This occurs whenever the sum of the two rotations is 45°, so that on two passes through the chips, one image component is at 90°. At the centerpoint of this line, the other image component (the bright component) is at 100% transmission at the analyzer or a fractional transmission of 1, since its axis is parallel to the analyzer axis. This is the highest contrast and highest polariscope transmission that can be achieved. The straight lines of positive slope are lines of constant fractional transmission of the bright image component. Note that the centerpoint on the infinite contrast line is also the brightest image point, if films of the same absorption are used, each having $22\frac{1}{2}°$ of rotation. However, if a completely transparent bias film could be achieved, then a point on the line such as $11\frac{1}{4}°$ display rotation and $33\frac{3}{4}°$ bias rotation would represent a fractional transmission of the analyzer reduced to about 0.70, but an absorbing film thickness of only one-fourth of the above amount. A brighter display would result, except at extremely high display film transmissions. The effect of differential material transmissions will be mentioned further below, but note that this figure shows polariscope transmission, not film transmissions.

Again, using films of equal thickness, but reducing the above thickness from that giving $22\frac{1}{2}°$ of rotation down to about 19%, we have a point still on the line of fractional transmission of 1, for the bright image component, but a contrast ratio of 19.38. (These numbers were selected because they are easy to calculate.) The difference in contrast ratio in going from infinity to 19.38 would not be noticeable except in a dark room; but, this is a lighted display, not in a dark room. This change eliminates about 7 microns of absorbing film thickness, so it may be considered that the region above the bowed line for contrast of 19.38 should be ruled out as wasteful of image brightness. The lower limit of contrast is also a subjective matter of judgment in the determination of the design domain. We know that contrast ratios below 1.5 still give readable images which are, however, uncomfortable. Drawing on past experience, one major system had a specified contractual contrast ratio of 4, and the actual shipped specimens were initially at 8. When production troubles caused a drop to the specification lower limit of 4, complaints came in. Accordingly, the region below 3.53 is ruled out in FIG. 9 as being too low in contrast. In the crescent-shaped region between contrasts of 3.35 and 19.38, at the tips of the crescent, the brightness drops off, although contrast is maintained. The resulting light loss can be compensated for by more ambient light at the risk of reflection problems and undesirably larger lamps. By ruling out analyzer fractional transmissions below 0.500, we only give up film combinations where the display chip has less than 5° of rotation, and a very thick 35° bias chip is used, or visa-versa. The bright image component axis will never be more than 60° away from the analyzer axis, within the remaining region of design. This is about 5° less than our typical projection displays, giving a somewhat more transmissive condition of the analyzer.

One further limitation of the design region may readily be made. As more transparent films are developed for the bias chip, the expectation is that they will probably be obtained by the use of formulations which degrade the magnetic properties. But even if that is not the result, in no case would one want to use a thicker display chip and a thinner bias chip, where the most opaque material was used for the thickest chip. If some more opaque film is magnetically preferable for the display chip, it would be used in thinner layers than the bias chip layer, so we can rule out the right half of the remaining design region as being a poor, indeed inverted, use of material. As shown in the figure, by ruling out areas of poor performance, we have defined a design domain centering around $C1=24°$ and $C2=12°$, but with considerable latitude around these values.

Figure 10:
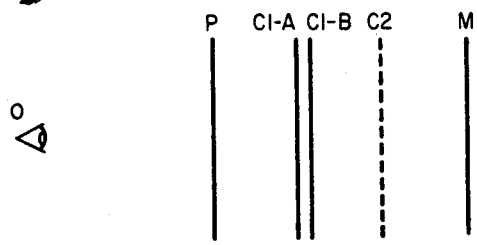
FIG. 10 is a simplified drawing of the present invention in a first alternate configuration.

Various modifications of the basic concept are possible as shown in simplified form in FIGS. 10–13. FIG. 10 shows that bias chip C1 can be divided into two film layers, C1A and C1B, so that each film can be thinner, for the same total effect. In some cases, thin films are easier to make any may have higher production yields than thicker films. These two films can be on separate substrates or on the opposite sides of the same substrate. One of these films can be on the opposite side of the substrate carrying the display posts of chip C2, or a bubble memory film.

Figure 11:
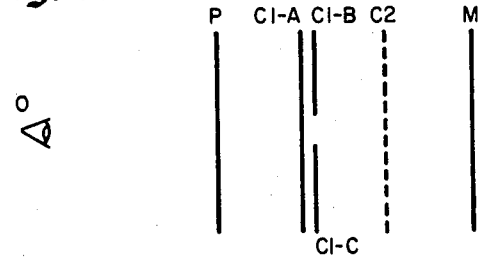
FIG. 11 is a simplified drawing of the display of the present invention in a second alternate embodiment.

FIG. 11 shows that the bias film can be divided into two layers as in FIG. 10, and one of these layers can be further split into two structured switchable films of the chip 20 type. When film C1A and C1B are magnetized in the same direction, the top half of the display functions as described in FIG. 5. If the bottom half of the split film, C1C, is magnetized in the opposite direction, and has the same rotation as C1, but oppositely directed, then the bias is cancelled in the bottom half of the display. A split-screen erase feature becomes possible in which new information may gradually be written at the bottom half of the display chip C2 without being visible to distract the observer until it is completed. Then C1C is reversed in polarity to display the corrected image. Alternatively, C1A may be reversed in polarity to show the bottom half and erase the top half of the image.

Figure 12:
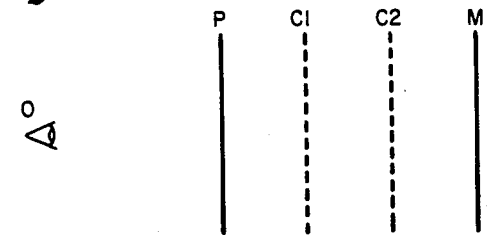
FIG. 12 is a simplified drawing of a third alternate embodiment of the display of the present invention.

In FIG. 12, C1 may be a fully structured chip like C2, with display information written on both chips. When both chips have the same rotation, the polarity of bright and dark areas on chip C2 is interchanged whenever chip C1 has an area written differently from its background. When the chips have different rotations, four levels of display brightness can be achieved.

Figure 13:
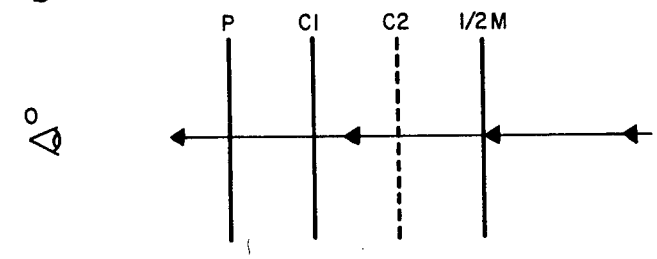
FIG. 13 is a simplified drawing of the display of the present invention in yet a fourth alternate embodiment which combines forward viewing with a superimposed display viewable by incident light.

FIG. 13 depicts the possibility of a see-through display combining the features described above with the ability to view a distant scene or projected information, by using a half-silvered mirror. Lenses may also be employed on each side of the device so that repeated eye accomodation is not required, and the device may also be combined with night-vision intensifier goggles.

Wherefore, having thus described my invention, I claim:

1. A front-lighted magneto-optic display comprising:
   (a) a magneto-optic display unit including:
      (1) a polarizer sheet
      (2) a first magneto-optic chip set to give a constant offset over its entire area to a light beam passing therethrough and,
      (3) a second magneto-optic chip adapted to be connected to and driven by a display driver; and,
   (b) a reflective surface.

2. The display of claim 1 and additionally comprising:
   a fairly clear, water-white, non-diffusing material which wets and adheres to the adjacent surfaces and has an index of refraction generally comparable to the layers so as to reduce surface reflection is placed between adjacent elements of the display.

3. The display of claim 1 or claim 2 and additionally comprising:
   an anti-reflective material disposed over the outer surface of said polarizer sheet.

4. The display of claim 1 and additionally comprising:

means for reducing reflection disposed on the surfaces of the elements of the display.

5. The display of claim 1 wherein:
said reflective surface is a diffusing surface which depolarizes only minimally.

6. The display of claim 1 in which a magneto-optic chip includes:
(a) a substrate, and
(b) at least a first bias film layer positioned on said substrate.

7. The display of claim 6 in which said first film layer is positioned on an obverse side of said substrate and a second film layer is positioned on the reverse side of said substrate.

8. The display of claim 7 in which respective ones of said first and second film layers are positioned on associated ones of first and second magneto-optic chip substrates.

9. The display of claim 1 in which said second magneto-optic chip has a first bias film layer positioned on an obverse side of said chip and display posts associated with said display driver positioned on the reverse side of said chip.

10. The display of claim 6 in which said second film layer is split into at least two structural and switchable films.

11. The display of claim 1 in which said first chip is adapted to have display information written thereon.

12. The display of claim 1 in which said reflective surface is a half-silvered mirror.

13. The display of claim 1 in which said first chip has a bias film having about 24° of rotation, and said second chip has a display film having about 12° of rotation.

14. The display of claim 13 in which said bias film exhibits a range of rotation from 5° to 35°, and said display film exhibits a complementary range of rotation from 35° to 5°.

15. The display of claim 1 in which said polarizer sheet is linear.

* * * * *